UNITED STATES PATENT OFFICE.

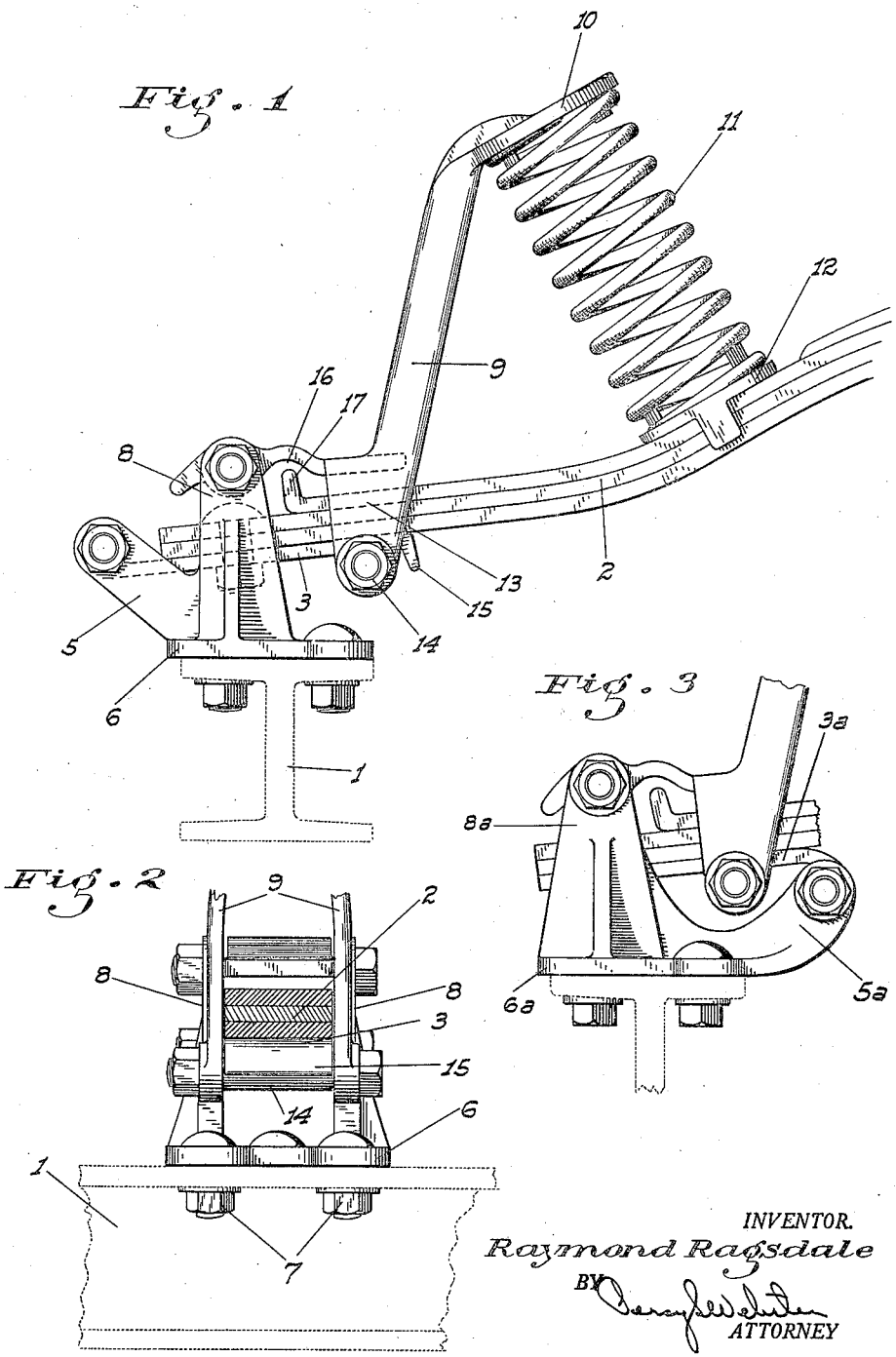

RAYMOND RAGSDALE, OF PORTERVILLE, CALIFORNIA.

SHOCK ABSORBER.

1,427,414.   Specification of Letters Patent.   Patented Aug. 29, 1922.

Application filed February 11, 1922. Serial No. 535,696.

*To all whom it may concern:*

Be it known that I, RAYMOND RAGSDALE, a citizen of the United States, residing at Porterville, in the county of Tulare, State of California, have invented certain new and useful Improvements in Shock Absorbers; and I do declare the following to be a full, clear, and exact description of the same, reference being had to the accompanying drawings, and to the characters of reference marked thereon, which form a part of this application.

This invention relates to improvements in shock absorbers for motor vehicles, and particularly to a type adapted to be used for the longitudinally disposed quarter-cantilever springs of cars of the Chevrolet type, being an improvement over those designs shown in my co-pending applications, Serial No. 363,955 filed March 8th, 1920, and Serial No. 450,296, filed March 21, 1821.

The principal object of my invention is to provide such an absorber so arranged and connected to the axle and main springs of the vehicle that the ordinary driving pressure or strain is taken through these springs, as the designer of the car intended it should be.

Another object is to provide an absorber which is very easy to install, has but few parts, and very little wear; and which is inexpensive to manufacture.

These objects I accomplish by means of such structure and relative arrangement of parts as will fully appear by a perusal of the following specification and claims.

In the drawings similar characters of reference indicate corresponding parts in the several views:

Fig. 1 is a side elevation of the absorber as installed.

Fig. 2 is a rear end view of the same.

Fig. 3 is a fragmentary side view showing a modified form of base.

Referring now more particularly to the characters of reference on the drawings, the numeral 1 denotes the front axle of the car, and 2 one of the main springs, ordinarily bolted at the front end onto the axle and fixed to the frame of the car at the other end.

When applying my improved absorber, the front end of the spring is disconnected from the axle and bolted or otherwise secured instead on top of a horizontally and longitudinally disposed plate 3 pivoted transversely and at its front end to and between lugs 5 formed with and projecting upwardly from a base 6 firmly fixed onto the axle 1 by bolts 7.

Also formed with and projecting up from the base at a point to the rear of the lugs 5 and thereabove are similar bearing lugs 8, to and between which is pivoted one end of a lever or arm 9, which extends a certain distance upwardly and rearwardly therefrom so as to over-hang the spring 2, terminating in a pad 10 which receives the upper end of a coil spring 11, the lower end of which seats on a pad 12 mounted on said spring 22.

To the rear of the base-lugs 8 the arm 9 is provided with ears 13 projecting downwardly past the edges of the spring leaves 2 and the plate 3, having a roller or similar member 14 pivoted therebetween and extending under the plate 3, and on which the rear end of the latter rides. This plate 3, to the rear of the roller, is provided with a downturned lip 15, to limit the rearward movement of the arm-ears 14 and roller.

Between the lugs 8 and the ears 13, the arm 9 is formed as an arch, as at 16, into which projects an up-turned lip 17 formed at the end of the uppermost leaf of the spring 2 at that point.

When installed, the spring 11 is normally under compression, means being provided during the installation of the device for attaining this end.

In Fig. 3, the position of the lugs on the base 6ª to which the plate is pivoted is reversed, and they are positioned as shown at 5ª, to the rear of the arm-lugs 8ª, the plate 3ª then extending forwardly of the base and lugs 5ª instead of as shown in Fig. 3.

In operation with either type of base, if relative closing-up movement takes place between the frame of the car to which the upper and rear end of the spring 2 is fixed, and the axle, as when the wheels strike an unevenness in the ground, the spring 2 tends to flatten out. The forward pivotal connection of the plate 3 with the base-lugs 5 is therefore relatively raised with respect to the rear end of the spring 2. It will be noted however that inasmuch as the spring 2 is rigidly fixed onto said plate, to all intents and purposes the plate and spring are one, and the latter could itself be fastened to the lugs with the same result. Since this plate has only a single pivotal connection, and that at its forward end, the rear end of the plate tends to be depressed toward the axle, causing it to press down on the roller 14. As the spring as stated has a tendency to flatten out, the spring-pads 10 and 12 are brought closer together, causing a further compression of the spring 11 and consequent absorption of the shock. This compressive action is enhanced by reason of the fact that the plate 3 is pressing down on the roller 14 and the ears 13, which being a part of the arm 9 and to the rear of the pivotal connection thereof with the base-lugs 8, tends to cause a downward movement of the pad 10 toward the pad 12. It will also be evident that the greater the relative movement between the axle and frame, the greater will be the compressive effect on the spring 11.

In a recoil action, when conditions are reversed, the greater curvature which the spring 2 then has, causes the arm 9 to be raised, which in turn causes the roller 14 to press upwardly against the spring 2, counteracting the tendency of the spring 11 to be unduly expanded.

In any case, it will be noted that the driving pressure or strain is transmitted directly from the axle to the cam-frame through the spring 2, plate 3 and base 6, so that no torsional strains of any kind are normally placed on the absorber structure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A shock absorber comprising a base member adapted to be fixed onto the axle of a vehicle, a plate pivotally mounted to one end of the base above the axle and projecting in the direction of the vehicle spring, the adjacent end of the latter being adapted to be secured onto the plate, an arm pivoted to the base above the plate and extending thence over said spring, a compression spring between the upper end of said arm and said vehicle spring, and a transverse bearing member attached to the arm intermediate its ends and extending under the plate and on which the free end of the latter rests.

2. A shock absorber comprising a base member adapted to be fixed onto the axle of a vehicle, a spring pivotally mounted to one end of the base above the axle and projecting in the direction of the vehicle spring, the adjacent end of the latter being adapted to be secured onto the plate, an arm pivoted to the base above the plate and at a point intermediate the ends thereof and extending thence over said spring, compression spring means interposed between the outer end of the arm and the vehicle spring, a transverse bearing member attached to the arm intermediate its ends and extending under the plate and on which the free end of the latter rests, and a downturned lip on the end of the plate beyond the bearing and against which the latter may abut to limit its movement.

3. A shock absorber comprising a base member adapted to be fixed onto the axle of a vehicle, a plate pivotally mounted to one end of the base above the axle and projecting in the direction of the vehicle spring, the adjacent end of the latter being adapted to be secured onto the plate, an arm pivoted to the base above the plate and extending thence over said spring, a compression spring between the upper end of said arm and said vehicle spring and means whereby with the flattening of the vehicle spring the compression spring will be further compressed.

4. A shock absorber structure comprising in combination with the vehicle spring pivotally mounted with respect to the axle of the vehicle at the end of said spring adjacent said axle and thereabove, an arm pivoted above said spring-pivot and extending thence over the spring, compressing spring means between the outer end of the arm and the vehicle spring and bearing means secured to the arm intermediate its ends and passing under the vehicle spring to form a support therefor.

In testimony whereof I affix my signature.

RAYMOND RAGSDALE.